United States Patent
Mendel et al.

(10) Patent No.: US 10,102,467 B1
(45) Date of Patent: Oct. 16, 2018

(54) METHOD AND APPARATUS FOR USING AN OVER SAMPLING ARCHITECTURE TO ACHIEVE A SOFTWARE DEFINED RADIO FOR NFC INTEGRATED CIRCUITS

(71) Applicant: NXP B.V., Eindhoven (NL)

(72) Inventors: Stefan Mendel, Graz (AT); Ulrich Andreas Muehlmann, Gratkorn (AT); Dominik Kurzmann, Kapfenberg (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/630,860

(22) Filed: Jun. 22, 2017

(51) Int. Cl.
| | |
|---|---|
| *H04B 1/10* | (2006.01) |
| *H04B 1/00* | (2006.01) |
| *H04L 27/38* | (2006.01) |
| *G06K 19/07* | (2006.01) |
| *G06K 19/077* | (2006.01) |
| *H04W 4/00* | (2018.01) |
| *H04B 5/00* | (2006.01) |
| *H04W 4/80* | (2018.01) |

(52) U.S. Cl.
CPC ... *G06K 19/0724* (2013.01); *G06K 19/07749* (2013.01); *H04B 5/0031* (2013.01); *H04B 5/0075* (2013.01); *H04W 4/008* (2013.01); *H04W 4/80* (2018.02)

(58) Field of Classification Search
CPC .. H04B 5/0075; H04B 5/0031; H04B 1/0025; H04B 1/0475; H04B 1/10; G06K 19/0724; G06K 19/07749; H04L 27/2338; H04L 27/3881
See application file for complete search history.

(56) References Cited

U.S. PATENT DOCUMENTS

| | | | | |
|---|---|---|---|---|
| 5,454,007 A | * | 9/1995 | Dutta | H03D 3/007 329/341 |
| 5,673,293 A | * | 9/1997 | Scarpa | H03D 1/22 375/321 |
| 5,774,499 A | * | 6/1998 | Ahn | H03D 3/007 367/7 |
| 5,969,570 A | * | 10/1999 | Unkrich | H03H 17/0227 329/304 |
| 2004/0005023 A1 | * | 1/2004 | Ham | H04L 7/042 375/368 |
| 2004/0131012 A1 | * | 7/2004 | Mody | H04B 7/0413 370/210 |

(Continued)

OTHER PUBLICATIONS

Zhang, L. et al. "NFC Quadrature Carrier Cancelling Receiver Design and Implementation", IEEE International Conference on Solid-State and Integrated Circuit Technology, 4 pgs. (Oct. 2014).

(Continued)

*Primary Examiner* — Andrew Wendell (57) ABSTRACT

Various embodiments relate to a method and apparatus for over sampling a RF carrier signal, the method including receiving, by an ADC, the RF carrier signal, sampling, by the ADC, the RF carrier signal using the selected clock signal which is at least quadruple the RF carrier signal, down sampling, by a RF-DSP, the RF carrier signal by a factor of two to generate I channel data and Q channel data, mixing down, by the RF-DSP, the I channel data and the Q channel data, and outputting, by the RF-DSP, the I channel data and Q channel data to a baseband DSP.

10 Claims, 6 Drawing Sheets

(56) References Cited

U.S. PATENT DOCUMENTS

| | | | | |
|---|---|---|---|---|
| 2005/0008101 | A1* | 1/2005 | Kazi | H04L 27/2332 375/330 |
| 2008/0130780 | A1* | 6/2008 | Cho | H04B 1/30 375/267 |
| 2010/0253405 | A1* | 10/2010 | Quan | H03K 5/1515 327/158 |
| 2011/0255011 | A1* | 10/2011 | Gu | H04N 5/52 348/731 |
| 2012/0230229 | A1* | 9/2012 | Tian | G06F 1/329 370/277 |
| 2015/0214987 | A1* | 7/2015 | Yu | H04B 1/0475 375/297 |

OTHER PUBLICATIONS

Darwhekar, Y. et al. "A 45nm CMOS Near-Field Communication Radio with 0.15A/m RX Sensitivity and 4mA Current Consumption in Card Emulation Mode" IEEE International Solid-State Circuits Conference Digest of Technical Press, 3 pgs. (Feb. 2013).

Morris, S. "A 90nm CMOS 13.56MHz NFC Transceiver", IEEE Asian Solid-State Circuits Conference, pp. 25-28 (Nov. 2009).

Keskin, N. et al. "A Low Power Receiver Architecture for Near Field Communication Readers", IEEE Wireless Telecommunications Symposium, 4 pgs. (Apr. 2014).

Lien, W.L. et al. "A Self-Calibrating NFC SoC with a Triple-Mode Reconfigurable PLL and a Single-Path PICC-PCD Receiver in 0.11μm CMOS", IEEE International Solid-State Circuits Conference Digest of Technical Papers, pp. 158-160 (2014).

Jeong, M. et al. "Multi-Band Multi-Mode Wireless Connectivity SoC for 802.11 a/b/g/n, BT 4.0 and NFC", IEEE International SoC Design Conference, pp. 163-164 (Oct. 2014).

Kapusta, R. et al. "A 14b 80 MS/s SAR ADC with 73.6 dB SNDR in 65 nm CMOS", IEEE Journal of Solid-State Circuits, vol. 48, No. 12, pp. 3059-3066 (Dec. 2013).

Wu, J. et al. "A 14-bit 200MS/s Low-Power Pipelined Flash-SAR ADC", IEEE 58$^{th}$ International Midwest Symposium on Circuits and Systems, 4 pgs. (Aug. 2015).

Shettigar, P. et al. "A 15mW 3.6GS/x CT-ΔΣ ADC with 36MHz Bandwidth and 83dB DR in 90nm CMOS", IEEE International Solid-State Circuits Conference, pp. 156-158 (Feb. 2012).

Lo, C.-L. "A 75.1dB SNDR 840MS/s CT ΔΣ Modulator with 30MHz Bandwidth and 46.4fJ/conv FOM in 55nm CMOS", IEEE Symposium on VLSI Circuits, 2 pgs. (Jun. 2013).

* cited by examiner

METHOD AND APPARATUS FOR USING AN OVER SAMPLING ARCHITECTURE TO ACHIEVE A SOFTWARE DEFINED RADIO FOR NFC INTEGRATED CIRCUITS

TECHNICAL FIELD

This disclosure relates generally to method for over sampling a signal, and more specifically, but not exclusively, to a Near Field Communication ("NFC") integrated circuit which over samples a signal carrier using a clock signal which increases the sampling frequency of an Analog to Digital Converter ("ADC").

BACKGROUND

The current analog front-end integrated circuits include complex parts for signal preconditioning, such as mixers or baseband amplifiers (BBAs), which either amplify or attenuate the received signal before digitizing it with the two separate ADCs.

Figure 1:
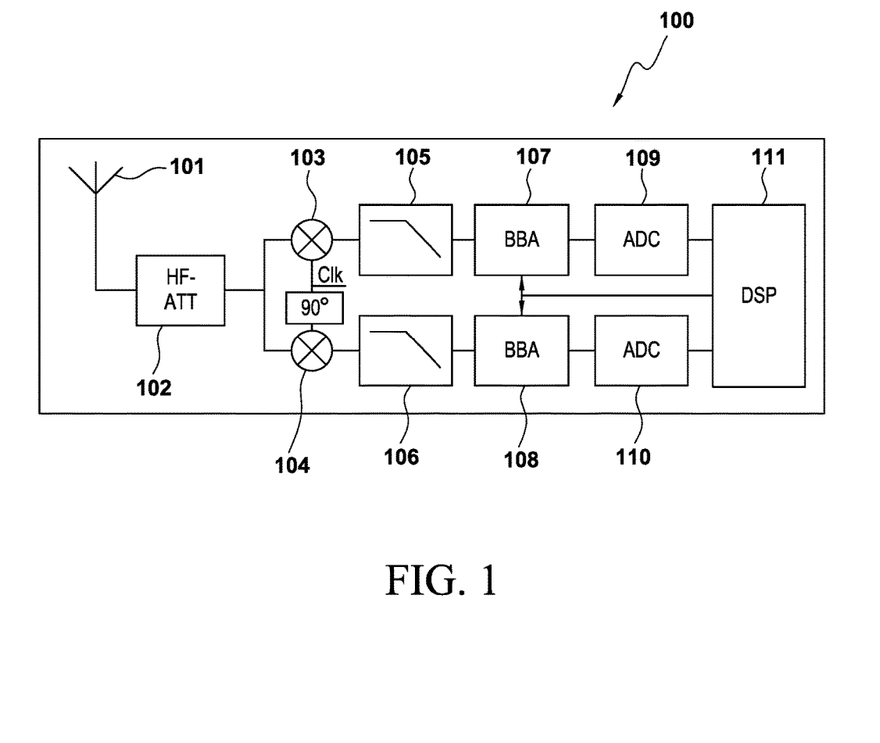
FIG. 1 illustrates a block diagram of an integrated circuit.

As illustrated in FIG. 1, the integrated circuit 100 includes an antenna 101, a High Frequency Attenuator ("HF-ATT") 102, two mixers 103 and 104, two low pass filters 105, 106, two BBAs 107, 108, two ADCs 109, 110, and a DSP 111.

As two signal paths are available, every function needs to be implemented twice, which adds redundancy to the system. The reason for having two signal paths is that the transmitted information can either be situated in the amplitude or phase of the carrier signal or in both of them.

Therefore I/Q demodulation is required for reconstruction of the transmitted signal in order to obtain the necessary data.

The two ADCs 109 and 110 are required which cost more chip space and power consumption and because the integrated circuit 100 needs to produce two clocks and where one clock is 90° phase shifted from the other, there is a lag time in the phase shifted channel which adds additional noise to the signal which contributes to a lower SNR.

Further, the mixers 103 and 104 in FIG. 1 can exhibit poor power supply rejection which adds additional noise to the signal and the mixers 103 and 104 can perform phase noise to amplitude noise conversion due to the uncertainty of the clock signal.

SUMMARY OF EXEMPLARY EMBODIMENTS

A brief summary of various embodiments is presented below. Embodiments address the need to create an integrated circuit which utilizes a single ADC which samples at an increased speed to accomplish the necessary function without cumbersome analog signal preconditioning using redundant parts.

In order to overcome these and other shortcomings of the prior art and in light of the present need to create an integrated circuit which utilizes a single ADC which samples at an increased speed, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments described herein relate to a method for over sampling a RF carrier signal, the method including receiving, by an analog digital converter ("ADC"), the RF carrier signal, sampling, by the ADC, the RF carrier signal using the selected clock signal which is at least quadruple the RF carrier signal, down sampling, by a Digital Signal Processor ("DSP"), the RF carrier signal by a factor of two to generate I channel data and Q channel data and mixing down, by the DSP, the I channel data and the Q channel data.

In an embodiment of the present disclosure, the method further including applying, by the RF-DSP, a moving average filter after mixing down the I channel data and the Q channel data.

In an embodiment of the present disclosure, the method further including outputting, by the DSP, the I channel data and Q channel data to a baseband DSP.

In an embodiment of the present disclosure, the moving average filter is a low pass filter configured to reduce noise.

In an embodiment of the present disclosure, the ADC receives the RF carrier signal from an RF channel.

In an embodiment of the present disclosure, the DSP includes a delay unit which delays at least one of the I channel data and the Q channel data by a single sampling period.

Various embodiments described herein relate to an integrated circuit for over sampling a RF carrier signal, the integrated circuit including an analog digital converter ("ADC") configured to receive the RF carrier signal, the ADC configured to sample the RF carrier signal using the selected clock signal which is at least quadruple the RF carrier signal, a Digital Signal Processor ("DSP") configured to down sample the RF carrier signal, by a factor of two to generate I channel data and Q channel data and the DSP configured to mix down, the I channel data and the Q channel data.

In an embodiment of the present disclosure, the integrated circuit, further including the DSP configured to apply, a moving average filter after mixing down the I channel data and the Q channel data.

In an embodiment of the present disclosure, the integrated circuit, further including the DSP configured to output the I channel data and Q channel data to a baseband DSP.

In an embodiment of the present disclosure, the moving average filter is a low pass filter configured to reduce noise.

In an embodiment of the present disclosure, the ADC receives the RF carrier signal from an RF channel.

In an embodiment of the present disclosure, the DSP includes a delay unit which delays at least one of the I channel data and the Q channel data by a single sampling period.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

In the integrated circuit in FIG. 1, the analog signal preconditioning parts and the second ADC require additional space and consume energy. These parts may be removed from the circuit as well as the second ADC by implementing the integrated circuit of the current embodiment.

An analog front-end design of the current embodiment omits the signal preconditioning part of the integrated circuit of FIG. 1. The current embodiment is directed towards a software defined radio ("SDR") system which performs the signal preconditioning processes previously performed by the signal preconditioning parts.

The integrated circuit design of the current embodiment utilizes a single ADC that samples at an increased speed but is able to achieve performance levels of the integrated circuit disclosed in FIG. 1.

Figure 2:
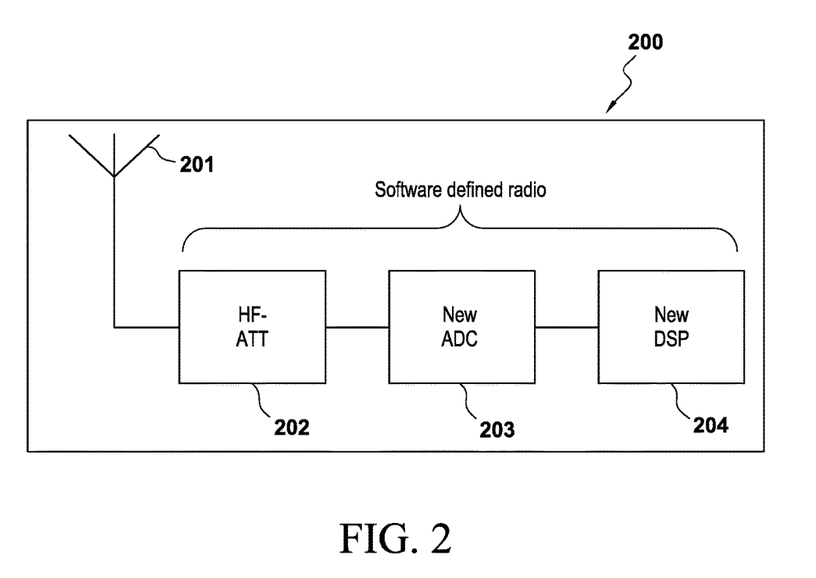
FIG. 2 illustrates a block diagram of an integrated circuit of the current embodiment.

FIG. 2 illustrates a block diagram of the integrated circuit of the current embodiment. The integrated circuit 200 may include an antenna 201, a High Frequency Attenuator ("HF-ATT") 202, an ADC 203 and a Digital Signal Processor ("DSP") 204. The Software Defined Radio ("SDR") may include the HF-ATT 202, the ADC 203 and the DSP 204.

As all analog responsibilities, including mixing and demodulating may be performed by the DSP 204 of the integrated circuit 200, the signal preconditioning blocks (i.e., low pass, mixer, BBA) may be omitted from the integrated circuit 200 of the current embodiment.

The requirements for the ADC 203 may need to be increased as the ADC design in FIG. 1 had slower speed and resolution requirements. The ADC 203 in the current embodiment will sample the RF carrier signal at a higher frequency, for example, four times faster, in order to spare one ADC in the signal path.

Figure 3:
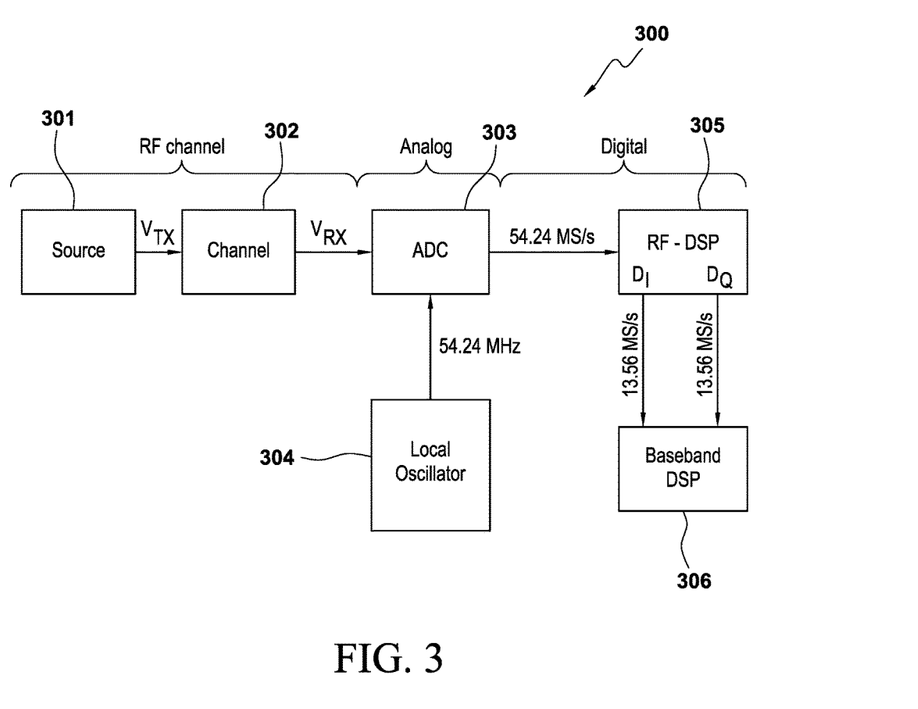
FIG. 3 illustrates a functional block diagram of an integrated circuit architecture.

FIG. 3 illustrates a functional block diagram of the architecture 300 of the current embodiment. The architecture includes a source 301, a channel 302, an ADC 303, a local oscillator 304, a Radio Frequency Digital Signal Processor ("RF-DSP") 305, and a baseband DSP 306.

The RF signal ($V_{RX}$) from the channel 302 is output directly into the ADC 303, and the ADC samples the RF signal ($V_{RX}$) at a sampling speed of 54.24 MS/s, using a clock signal that is output by the local oscillator 304 directly into the ADC 303.

The sampling rate output by the local oscillator 304 may be four times (or more) the carrier frequency which, for example, is 13.56 MHz.

The sampling rate is quadrupled as doubling the sampling rate, to for example, 27.12 MHz would not provide sufficient output data to recover I channel data and Q channel data.

If the sampling rate was doubled, the ADC 303 could continuously sample at the zero-crossings of the carrier signal which would lead to zero output voltage.

Sampling at double the RF carrier frequency would output only I channel data or Q channel data, but not both sets of data, and in order to obtain both sets of channel data, the RF carrier signal must be sampled at a rate that is at least quadruple the sampling rate.

Therefore, the sampled signal data must include one channel that contains data to recover the signal, which occurs when using quadruple the sampling rate, for example, 54.24 MHz. The output to the RF-DSP 305 and the baseband DSP 306 is discussed in FIG. 4.

Figure 4:
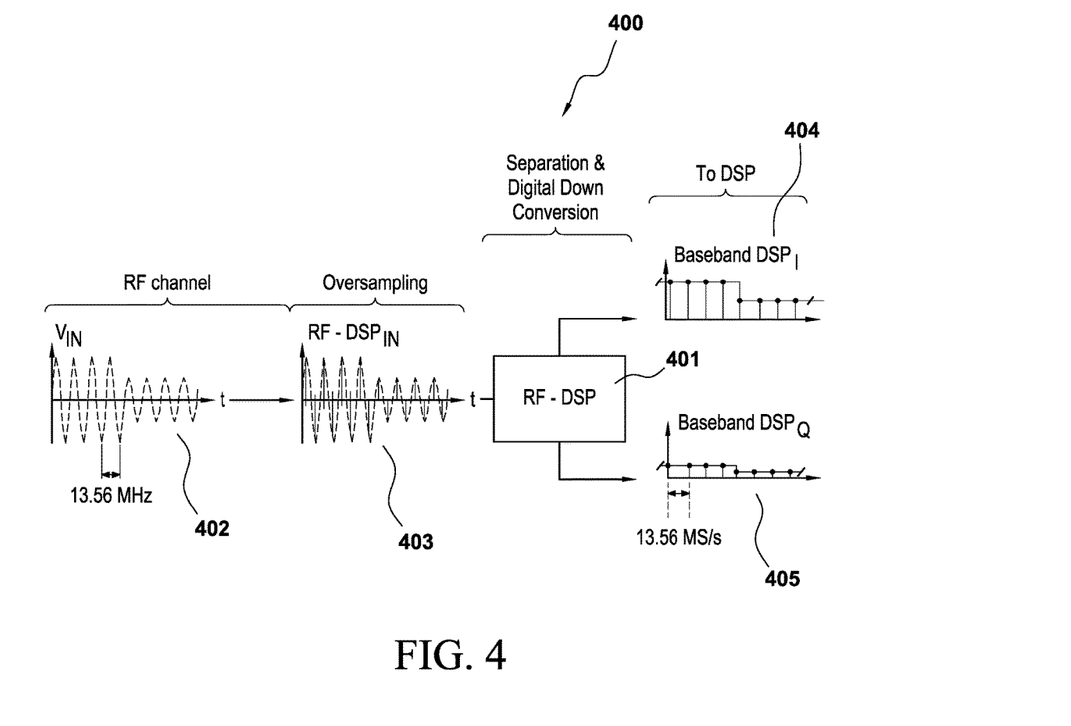
FIG. 4 illustrates a sampling graph of the clock.

FIG. 4 illustrates a diagram 400 of the signal while the signal is oversampled in the ADC and separated in the RF-DSP 401.

For example, the RF carrier signal 402 may have a frequency of 13.56 MHz which is input into the ADC where the sampling rate is over sampled by quadrupling the sampling rate to, for example, 54.24 MHz. The oversampled data is input into the RF-DSP 401.

FIG. 4 further illustrates that one period of the RF carrier signal 402 is discretized by four samples, phase shifted 90° to each other.

Every second sample in the over sampling 402 belongs to the in-phase channel and quadrature channel, respectively.

The RF-DSP 401 may separate every second sample to receive I channel data 404 and Q channel data 405.

Figure 5:
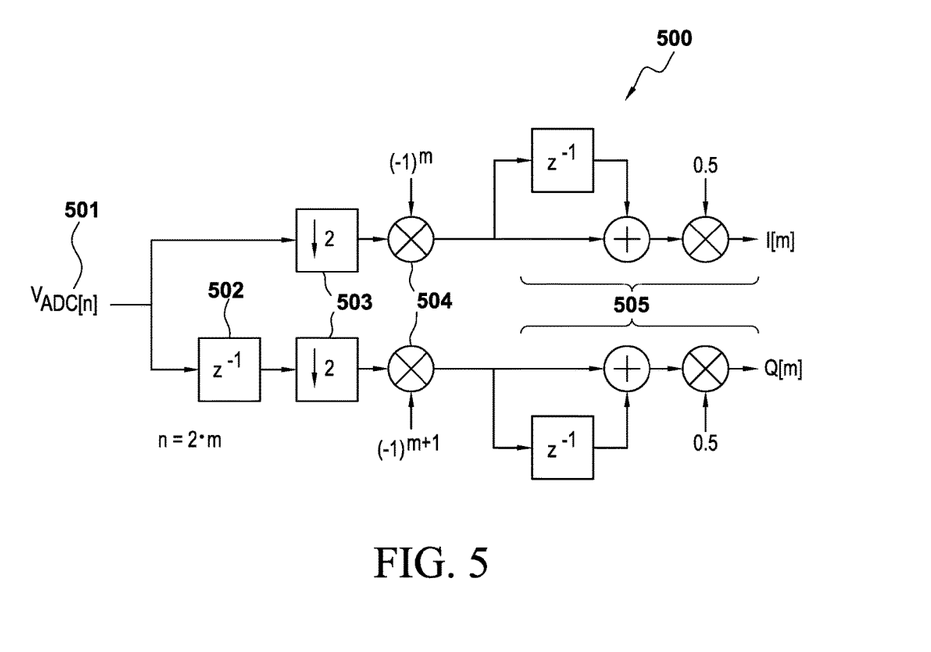
FIG. 5 illustrates a signal flow diagram.

FIG. 5 is a signal flow diagram 500 of the RF-DSP.

The signal $V_{ADC}[n]$ 501 is output from the ADC 303 and input into the RF-DSP 401. After the RF-DSP 401 separates the discretized inputs into two separate channels, FIG. 5 illustrates that as every second sample of each channel is negative in over sampling 403, and as a result every second sample of each channel is inverted.

Each signal $V_{ADC}[n]$ 501 is then down sampled by a factor of ↓2 503 to make two channels, with every channel having half of the sampling frequency. Then, each signal after being down sampled 504 is down mixed by $(-1)^m$ or $(-1)^{m+1}$, as every second sample has a different sign and the down sampling 504 compensates for that different sign.

A moving average filter 505 may be applied to each signal $V_{ADC}[n]$ to output I[m] and Q[m] which acts as low pass filter for noise and high peak reduction.

The result is that each output I and Q signal is output at half of the input data rate. The I and Q signals may then be evaluated with DSP procedure.

Figure 6:
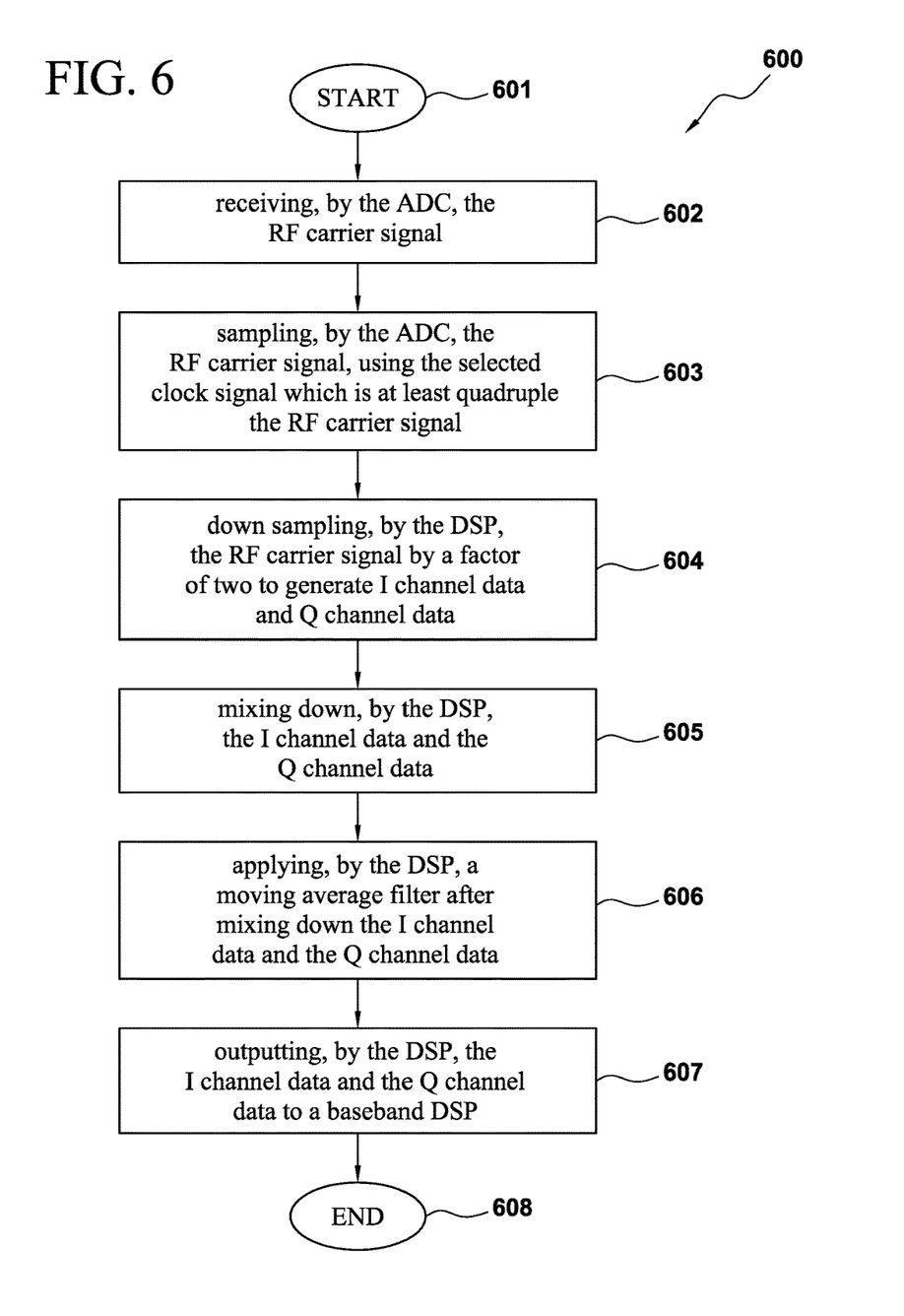
FIG. 6 illustrates a flow chart of the method for over sampling a signal.

FIG. 6 illustrates a method for over sampling a signal 600.

The method 600 begins at step 601 and proceeds to step 602.

The method 600 then proceeds to step 602 which receives, by the ADC, the RF carrier signal.

The method 600 then proceeds to step 603 which samples, by the ADC, the RF carrier signal, using the selected clock signal which is at least quadruple the RF carrier signal.

The method 600 then proceeds to step 604 which down samples, by the RF-DSP, by a factor of two to generate I channel data and Q channel data.

The method 600 then proceeds to step 605 which mixes down, by the RF-DSP, the I channel data and the Q channel data.

The method 600 then proceeds to step 606 which applies, by the RF-DSP, a moving average filter after mixing down the I channel data and the Q channel data.

The method 600 then proceeds to step 607 which outputs, by the RF-DSP, the I channel data and Q channel data to a baseband DSP.

Steps 604, 605, 606 and 607 may be performed on a single DSP or by the RF-DSP and a baseband DSP.

The method 600 then proceeds to step 608 to end.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for over sampling a RF carrier signal, the method comprising:
   receiving, by an analog digital converter ("ADC"), the RF carrier signal;
   sampling, by the ADC, the RF carrier signal using the selected clock signal which is at least quadruple the RF carrier signal;
   down sampling, by a Digital Signal Processor ("DSP"), the RF carrier signal by a factor of two to generate I channel data and Q channel data, and
   mixing down, by the DSP, the I channel data and the Q channel data,
   applying, by the DSP, a moving average filter after mixing down the I channel data and the Q channel data.

2. The method of claim 1, further comprising:
   outputting, by the DSP, the I channel data and Q channel data to a baseband DSP.

3. The method of claim 1, wherein the moving average filter is a low pass filter configured to reduce noise.

4. The method of claim 1, wherein the ADC receives the RF carrier signal from an RF channel.

5. The method of claim 1, wherein the DSP includes a delay unit which delays at least one of the I channel data and the Q channel data by a single sampling period.

6. An integrated circuit for over sampling a RF carrier signal, the integrated circuit comprising:
   an analog digital converter ("ADC") configured to receive the RF carrier signal;
   the ADC configured to sample the RF carrier signal using the selected clock signal which is at least quadruple the RF carrier signal;
   a Digital Signal Processor ("DSP") configured to down sample the RF carrier signal, by a factor of two to generate I channel data and Q channel data, and
   the DSP configured to mix down, the I channel data and the Q channel data,
   wherein the DSP is further configured to apply a moving average filter after mixing down the I channel data and the Q channel data.

7. The integrated circuit of claim 6, further comprising:
   the DSP configured to output the I channel data and Q channel data to a baseband DSP.

8. The integrated circuit of claim 6, wherein the moving average filter is a low pass filter configured to reduce noise.

9. The integrated circuit of claim 6, wherein the ADC receives the RF carrier signal from an RF channel.

10. The integrated circuit of claim 6, wherein the DSP includes a delay unit which delays at least one of the I channel data and the Q channel data by a single sampling period.

\* \* \* \* \*